United States Patent
Alves et al.

(10) Patent No.: US 11,694,840 B2
(45) Date of Patent: Jul. 4, 2023

(54) TRANSFORMER ARRANGEMENT

(71) Applicant: Hitachi Energy Switzerland AG, Baden (CH)

(72) Inventors: Roberto Alves, Västerås (SE); Nan Chen, Västerås (SE); Frans Dijkhuizen, Skultuna (SE); Jan Svensson, Västerås (SE); Alireza Nami, Västerås (SE)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/765,702

(22) PCT Filed: Dec. 18, 2020

(86) PCT No.: PCT/EP2020/087182
§ 371 (c)(1),
(2) Date: Mar. 31, 2022

(87) PCT Pub. No.: WO2021/123281
PCT Pub. Date: Jun. 24, 2021

(65) Prior Publication Data
US 2022/0344093 A1 Oct. 27, 2022

(30) Foreign Application Priority Data
Dec. 20, 2019 (EP) ..................... 19218976

(51) Int. Cl.
*H01F 27/38* (2006.01)
*H01F 27/40* (2006.01)
(52) U.S. Cl.
CPC ......... *H01F 27/385* (2013.01); *H01F 27/402* (2013.01)

(58) Field of Classification Search
CPC ........ H01F 27/385; H01F 27/402; H02J 3/18; H02J 3/01; H02H 7/04; H02M 5/10; Y02E 40/30
See application file for complete search history.

(56) References Cited

U.S. PATENT DOCUMENTS 6,351,106 B1 * 2/2002 Kramer .................. H02P 13/06
323/263
2010/0201338 A1 8/2010 Haj-Maharsi et al.
(Continued)

FOREIGN PATENT DOCUMENTS

CN 102027668 A 4/2011
CN 102823121 A 12/2012
(Continued)

OTHER PUBLICATIONS

1st Office Action, Chinese Patent Application No. 202080076329X, dated Sep. 15, 2022, 9 pages.
(Continued)

*Primary Examiner* — Giovanni Astacio-Oquendo
*Assistant Examiner* — Zannatul Ferdous
(74) *Attorney, Agent, or Firm* — Sage Patent Group

(57) ABSTRACT

Provided is a transformer arrangement wherein active and/or reactive power can be injected in an alternating current link using a current regulator and a voltage regulator portion, wherein at least one winding with which the current regulator is connected in parallel is at least one tertiary winding, and wherein the current regulator includes a number of current regulator sections, each connected to a corresponding voltage regular section of a voltage regulator portion via a corresponding dc link.

12 Claims, 4 Drawing Sheets

(56) References Cited

U.S. PATENT DOCUMENTS

| | | |
|---|---|---|
| 2010/0220499 A1 | 9/2010 | Haj-Maharsi et al. |
| 2012/0187924 A1* | 7/2012 | Dommaschk ......... H02J 3/1842 |
| | | 323/205 |
| 2014/0133185 A1 | 5/2014 | Wijekoon et al. |
| 2014/0176088 A1 | 6/2014 | Eckhardt et al. |
| 2016/0118908 A1 | 4/2016 | Bhalodi et al. |
| 2017/0077746 A1 | 3/2017 | Viswanathan |

FOREIGN PATENT DOCUMENTS

| | | | |
|---|---|---|---|
| CN | 103283140 A | | 9/2013 |
| CN | 106169708 A | | 11/2016 |
| CN | 106549486 A | | 3/2017 |
| CN | 109038691 A | * | 12/2018 |
| CN | 109038691 A | | 12/2018 |
| DE | 199933811 A1 | | 2/2001 |
| KR | 20130049597 A | | 5/2013 |
| KR | 101431469 B1 | | 8/2014 |

OTHER PUBLICATIONS

Ding, H-F, et al., "A Hybrid Power Quality Conditioner and Its Control Strategy," Proceedings of the CSEE, vol. 26, No. 8, Apr. 2006, 6 pages.

MinZheng, M.A., et al., "High Power Cascaded Converter for Multi-coil Permanent Magnet Wind Generator System," Electric Drive, 2010, vol. 40, No. 3, 5 pages.

First Office Action, Indian Patent Application No. 202247010652, dated Aug. 25, 2022, 6 pages.

Decision for Grant, Korean Patent Application No. 10-2022-7014522, dated Sep. 6, 2022, 4 pages.

International Search Report and Written Opinion of the International Searching Authority, PCT/EP2020/087182, dated Feb. 15, 2021, 13 pages.

Extended European Search Report, European Patent Application No. 19218976.9, dated Feb. 23, 2020, 13 pages.

International Preliminary Report on Patentability, PCT/EP2020/087182, dated Jun. 17, 2021, 17 pages.

* cited by examiner

TRANSFORMER ARRANGEMENT

CROSS REFERENCE TO RELATED APPLICATIONS

This application is a 35 U.S.C. § 371 national stage application of PCT International Application No. PCT/EP2020/087182 filed on Dec. 18, 2020, which in turn claims foreign priority to European Patent Application No. 19218976.9, filed on Dec. 20, 2019, the disclosures and content of which are incorporated by reference herein in their entirety.

FIELD OF INVENTION

The present invention relates to a transformer arrangement for electrical power applications.

BACKGROUND

Transformers are important equipment in electric power applications such as power transmission, power distribution and power generation. At times there is furthermore a need to regulate the active power output from a transformer.

One way to regulate the output power of a transformer is disclosed in DE 199933811, where a converter setup is used for load flow control, which setup has a first converter connected to a secondary winding of a transformer and second converter connected in series with this secondary winding, where the two converters are controlled for regulating the active power output by the transformer.

CN 109038691 discloses a frequency and voltage regulation control strategy of a hybrid power electronic transformer based on virtual inertia. The main circuit topology comprises a distribution network multi-winding transformer, a series-parallel back-to-back converter, a filter and a static switch, aimed at power quality control.

US 2017/077746 discloses an uninterruptible power supply (UPS), including a transformer having a primary winding, a secondary winding and a tertiary winding. The UPS also a rectifier coupled to the secondary winding and an inverter coupled to an output of the rectifier.

It is additionally often of interest to combine the transformer with other functionality such as current interruption or limiting functionality.

However, there is therefore still a room for improvement in the field, especially regarding combining power flow control with current interruption or limitation.

SUMMARY OF THE INVENTION

One object of the present invention is therefore to provide a transformer arrangement capable of combining power flow control with current interruption or limitation.

This object is according to a first aspect achieved through a transformer arrangement comprising a transformer having a primary and a secondary winding, a current regulator and an output handling module comprising a voltage regulator portion and a circuit breaker portion, where the output handling module is connected to the secondary winding and connectable in series between this secondary winding and a load via an alternating current link. The current regulator is connected in parallel with at least one winding that is magnetically coupled to the primary winding. The current regulator is also connected to the voltage regulator portion of the output handling module via at least one direct current link such that active and/or reactive power can be injected in the alternating current link using the current regulator and voltage regulator portion. The at least one winding, with which the current regulator is connected, may be at least one tertiary winding. The current regulator may comprise a number of current regulator sections, each connected to a corresponding voltage regular section of the voltage regulator portion via a corresponding dc link. The current regulator may thereby be connected in parallel with at least one winding that may be a tertiary winding. The current regulator may more particularly be connected in parallel with each such tertiary winding. According to one aspect each current regulator section is connected in parallel with a corresponding tertiary winding. According to another aspect, all current regulator sections are connected in parallel with the same tertiary winding.

The output handling module may be connected to a first end of the secondary winding and connectable between the first end of the secondary winding and a first end of the load. Thereby the output handling module lacks a connection to a second end of the secondary winding.

The at least one winding, with which the current regulator is connected in parallel, may be the secondary winding. The current regulator may thereby be connected in parallel with one winding that may be the secondary winding.

The output handling module may comprise a chain link of switching blocks connected to the secondary winding, where the switching blocks comprise a first set of voltage contribution blocks forming the voltage regulator portion and a second set of circuit breaker blocks forming the circuit breaker portion, where the first set of voltage contribution blocks is configured to add an offset voltage to the voltage output by the transformer and the second set of circuit breaker blocks is configured to interrupt or limit a current running through the chain link.

The voltage contribution block may be a voltage contribution block with bipolar voltage contribution capability. It may thus be able to give a voltage contribution with two different polarities. This may be done using a full-bridge voltage contribution block. The voltage contribution block may additionally comprise a first energy storage element, for instance in the form of a capacitor.

The first set of voltage contribution blocks may be controllable to provide a positive or negative voltage contribution at a phase angle to the load current. The phase angle may be the phase angle of $\pm\pi/2$. As an alternative the phase angle may be a phase angle in a range 0-$\pm\pi/$.

The voltage contribution may be a fraction of the voltage output by the transformer, for instance a fraction of the voltage at the secondary winding of the transformer. The fraction may have an upper limit. The fraction may be at most 30% of the voltage output by the transformer. However, the fraction may also be lower such as at most 20%, 15% or even 10%.

The first set of voltage contribution blocks may additionally be controllable to regulate harmonics and/or flicker in the voltage output by the transformer.

The second set of circuit breaking blocks may in turn be controllable to interrupt or limit the current through the chain link based on the detection of a fault.

At least some of the blocks may additionally be grouped into cells, where each cell comprises at least one voltage contribution block and at least one circuit breaking block.

The number of voltage contribution blocks used in the chain link may be selected for a desired voltage range of a voltage contribution to be made to the voltage across the corresponding transformer winding. The number of circuit breaker blocks may in turn be selected for achieving a desired current interrupting or limiting level.

The transformer arrangement may additionally comprise a control unit configured to control the current regulator, voltage regulator portion and circuit breaker portion, which control may be the control of switches in these entities.

The invention has a number of advantages. It allows injecting and withdrawal of active and reactive power to or from the ac link. This is combined with current interruption or limitation in a compact device as it is possible to provide a voltage change without the use of a tap changer or with a simpler tap changer realization. A number of further functions can also easily be implemented, such as impedance matching and harmonics and flicker regulation.

BRIEF DESCRIPTION OF THE DRAWINGS

The present invention will in the following be described with reference being made to the accompanying drawings, where.

DETAILED DESCRIPTION OF THE INVENTION

The present invention concerns a transformer arrangement for use in electric power applications such as power generation, power transmission and power distribution.

Figure 1:
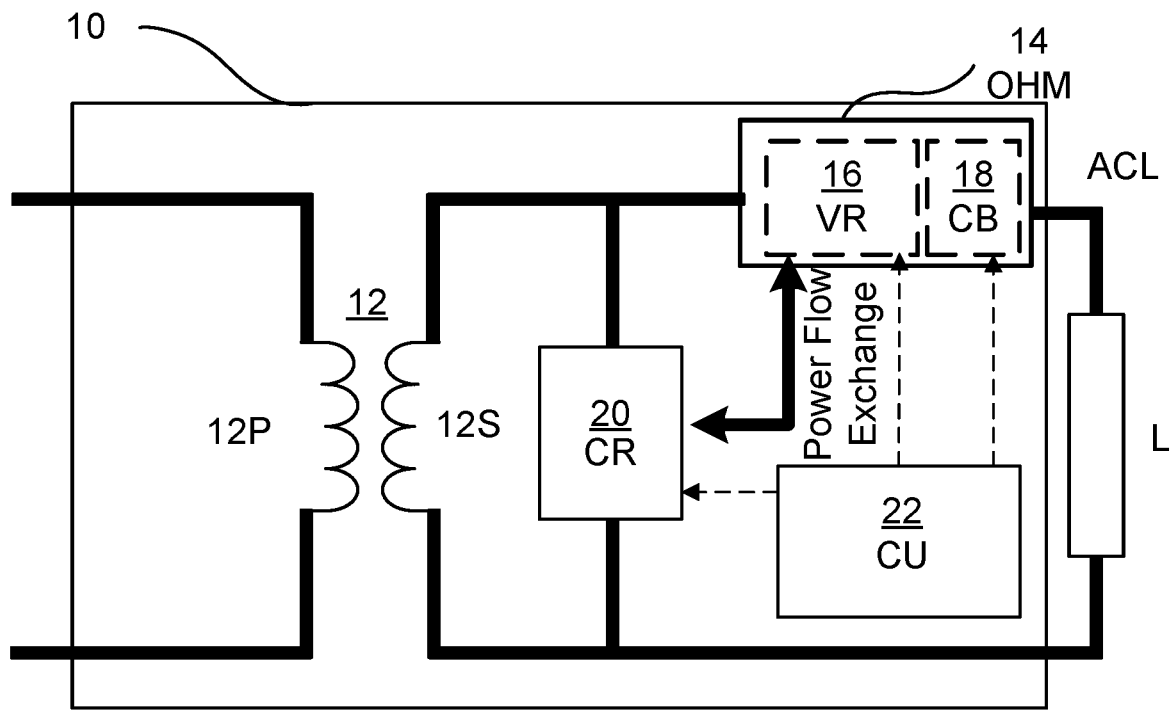
FIG. 1 schematically shows a first variation of a transformer arrangement comprising a transformer, a current controller, an output handling module comprising a voltage regulator portion and a circuit breaker portion, and a control unit controlling the current controller, voltage regulator portion and circuit breaker portion.

FIG. 1 schematically shows a first variation of the transformer arrangement 10. This realization is a single-phase realization. It should be realized that it is also possible to provide three-phase realizations of the transformer arrangement.

The transformer arrangement 10 comprises a transformer 12 having a primary winding 12P and a secondary winding 12S. As is known in the art the primary and secondary windings 12P and 12S are magnetically coupled to each other and in order to improve on this coupling they may also be wound around a magnetic core. The transformer arrangement 10 also comprises an output handling module OHM 14 connected in series with the secondary winding 12S. The output handling module 14 is connected between the secondary winding 12S and a load L. It is more particularly connected between a first end of the secondary winding 12S and a first end of the load L. Thereby the output handling module 14 interconnects the transformer 12 with the load L, which is done via an alternating current (ac) link ACL. As can be seen the secondary winding also has a second end. It can be seen that as the output handling module 14S is connected in series with the secondary winding and already has a connection to the first end of the secondary winding, it lacks a connection to the second end of the secondary winding.

The output handling module 14 comprises a voltage regulator portion VR 16 and a circuit breaker portion CB 18. The voltage regulator portion 16 regulates a voltage being output by the transformer arrangement on the ac link ACL, while the circuit breaker portion 18 interrupts or limits the current through the output handling module 14 and thereby also interrupts or limits the current to the load L. This may for instance be made in case there is a fault.

A current regulator CR 20 regulates the current on the ac link ACL. The current regulator 20 is connected in parallel with at least one winding magnetically coupled to the primary winding 12P. The current regulator may more particularly be connected in parallel with the secondary winding or in parallel with at least one tertiary winding.

In the first variation shown in FIG. 1, the current regulator 20 is connected in parallel with the secondary winding 12S. For this reason, a first end of an ac side of the current regulator 20 may be connected to a first end of the secondary winding 12S, while a second end of the ac side of the current regulator 20 may be connected to the second end of the secondary winding 12S. The current regulator 20 has a dc side, which is connected to a dc side of the voltage regulator portion 16 via at least one direct current (dc) link, where the dc side of the voltage regulator portion 16 interconnects the first end of the secondary winding 12S with the ac link ACL. It is possible with a bidirectional power flow between the current regulator 20 and the voltage regular portion 16. In the present example there is only one dc link (not shown), which may be implied with a bidirectional arrow. The voltage regulator portion 16 may be able to inject and withdraw reactive power into and from the ac link ACL on its own motion. Through the combination of current regulator 20 and voltage regulator portion 16 and the exchange of power between them, the voltage regulator portion 16 may inject and withdraw active power into and from the ac link ACL with the assistance of the current regulator 20.

A control unit CU 22 is set to control the current regulator 20, the voltage regulator portion 16 and the circuit breaker portion 18. The control unit 22 thus performs the active and reactive power injection and withdrawal as well as controls the circuit breaker functionality of the circuit breaker portion 18.

The control unit 22 may be realized as a computer. It may also be realized as a processor with associated program memory comprising computer instructions realizing the control functionality. The control unit may additionally be realized as one or more dedicated circuits such as an Application-Specific Integrated circuit (ASIC) or Field-Programmable Gate Array (FPGA).

Both the current regulator 20 and the voltage regulator portion 16 of the output handling module 14 may be realized as a converter converting between ac and dc, for instance as a voltage source converter. They may be realized as power electronics (PE) converter blocks regulating output current (current regulator) and output voltage (voltage regulator portion). The current regulator may as an example be a two-level (2L) converter, a neutral point clamped (NPC) converter, a T-type converter or a modular multilevel converter (MMC). Also, the voltage regulator section may be realized using any of the above-mentioned converter types.

It may be of interest to isolate at least one of current regulator 20 and the voltage regulator portion 16 from the ac link ACL. However, as it is of interest to also combine the voltage regulator functionality with the circuit breaker functionality, some embodiments provide that when isolation is needed, this isolation is provided at the current regulator 20.

Figure 2:
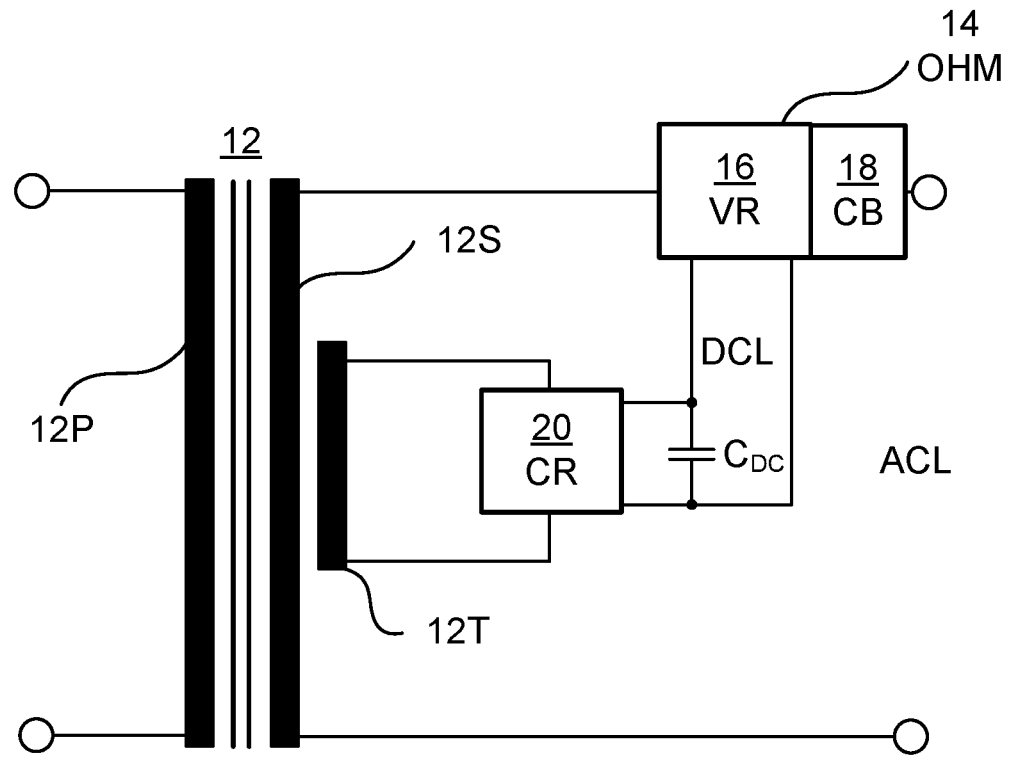
FIG. 2 schematically shows a second variation of the transformer arrangement.

FIG. 2 shows a second realization of the transformer arrangement when there is isolation of the current regulator 20. Also, in this case the transformer arrangement comprises a transformer 12 with a primary and secondary winding 12P and 12S, where the output handling module 14 with voltage regulator portion 16 and circuit breaker portion 16 is connected in series with the secondary winding 12S. In this case the current regulator 20 is connected in parallel with a single tertiary winding 12T, which tertiary winding 12T is magnetically coupled to the primary winding 12P and isolated from the primary winding 12P as well as from the secondary winding 12S. In this second variation there is also a single dc link DCL connected between the current regulator 20 and the voltage regulator portion 16, where the dc link comprises a dc link capacitor CDC.

Figure 3:
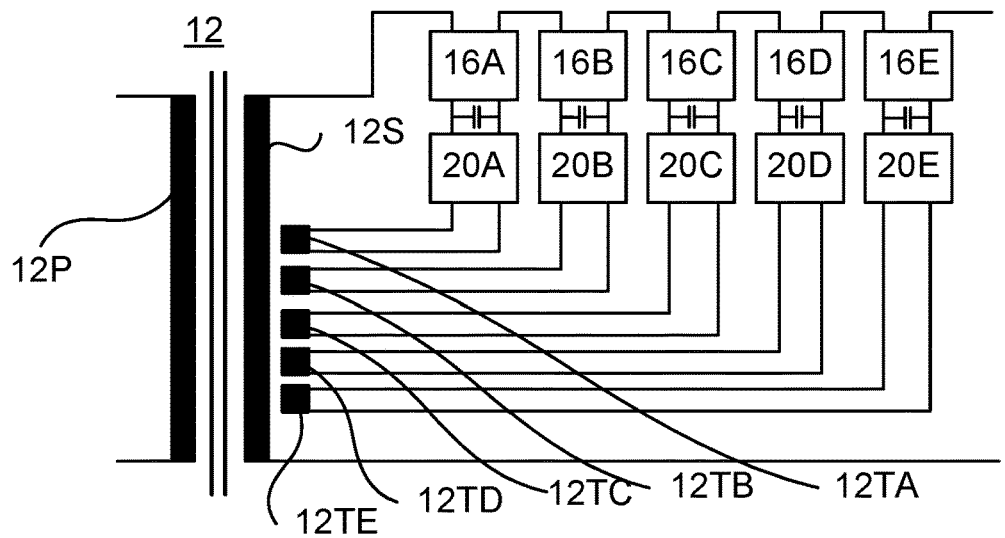
FIG. 3 schematically shows a third variation of the transformer arrangement.

FIG. 3 shows a third variation of the transformer arrangement, in which figure the circuit breaker portion has been omitted from the output handling module.

In this third variation the current regulator comprises a number of current regulator sections 20A, 20B, 20C, 20D and 20E, enabling a modular design. Each current regulator section is connected to a corresponding voltage regulator section 16A, 16B, 16C, 16D and 16E of the voltage regulator portion via a dedicated dc link. Each current regulator section is furthermore connected in parallel with a corresponding tertiary winding of the transformer, where each tertiary winding is magnetically coupled to the primary winding 12P and isolated from the primary and secondary windings 12P and 12S as well as from each other. In the example given here a first current regulator section 20A has an ac side connected to a first tertiary winding 12TA and a dc side connected to the dc side of a first voltage regulator section 16A, a second current regulator section 20B has an ac side connected to a second tertiary winding 12TB and a dc side connected to the dc side of a second voltage regulator section 16B, a third current regulator section 20C has an ac side connected to a third tertiary winding 12TC and a dc side connected to the dc side of a third voltage regulator section 16C, a fourth current regulator section 20D has an ac side connected to a fourth tertiary winding 12TE and a dc side connected to the dc side of a fourth voltage regulator section 16D and a fifth current regulator section 20E has an ac side connected to a fifth tertiary winding 12TE and a dc side connected to the de side of a fifth voltage regulator section 16E. The voltage regulator sections 16A, 16B, 16C, 16D and 16E are connected in cascade with each other between the first end of the secondary winding 12S and the load L.

The modular design allows connection to different transformer designs (windings) and power electronic converters. It is furthermore possible to by-pass one or more modules, such as in case of failure, but at a lower injected voltage. The voltage regulator sections 16A, 16B, 16C, 16D and 16E can work independently and at the same time with positive and negative voltage.

The current regulator sections 20A, 20B, 20C, 20D and 20E each receive a voltage that is the transformation of the voltage across the primary winding 12P and converts this to a dc voltage on a dedicated dc link for transmitting and receiving power to and from a corresponding voltage regulator section 16A, 16B, 16C, 16D and 16E. The voltage regulator sections 16A, 16B, 16C, 16D and 16E in turn generate a voltage offset with which the voltage being output by the transformer 12 on the secondary winding 12S is adjusted and which regulates the power flow on the ac link ACL.

It should here be realized that each current regulator section 20A, 20B, 20C, 20D and 20E may be connected to a corresponding voltage regulator section 16A, 16B, 16C, 16D and 16E. There may, however, be more voltage regulator sections than current regulator sections. This means that there may exist voltage regulator sections that are not connected to a corresponding current regulator section. It is possible that such non-connected voltage regulator sections are dedicated to the injection and withdrawal of reactive power into and from the ac link, while the voltage regulator sections that are connected to current regulator sections are limited to injection and withdrawing active power to and from the ac link.

The voltage regulator portion is in this case may be realized as an MMC, where each voltage regulator section is realized as one or more voltage providing blocks with bipolar voltage contribution capability. This voltage providing block is described in more detail below. However, the current regulator sections may each be realized as a two-level (2L) converter, an NPC converter, a T-type converter or an MMC. In the case of an MMC, it is also possible to use voltage providing blocks or submodules. These can be of both half-bridge and full-bridge type. They may thus have unipolar or bipolar voltage contribution capability.

Figure 4:
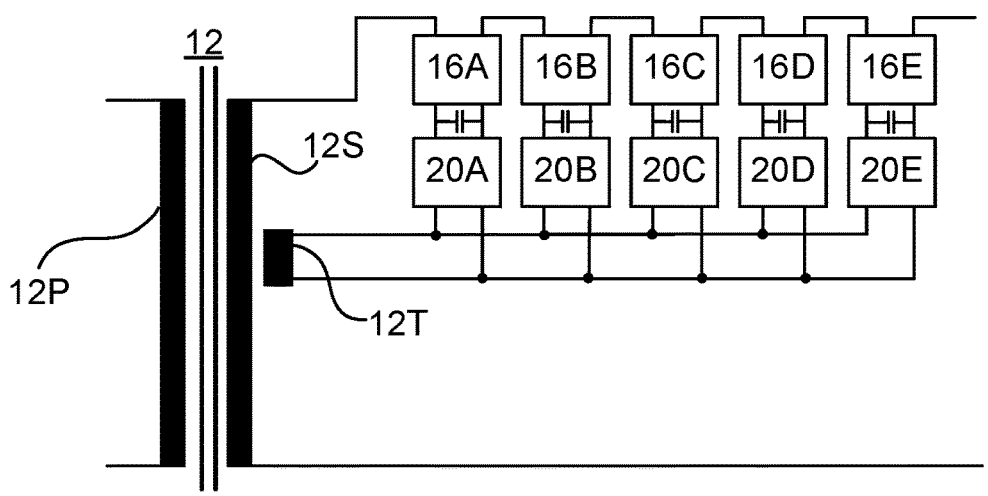
FIG. 4 schematically shows a fourth variation of the transformer arrangement.

FIG. 4 shows a fourth variation of the transformer arrangement, in which figure the circuit breaker portion has been omitted from the output handling module.

Also, in this fourth variation the current regulator comprises a number of current regulator sections 20A, 20B, 20C, 20D and 20E, each connected to a corresponding voltage regulator section 16A, 16B, 16C, 16D and 16E of the voltage regulator portion via a dedicated dc link. The connection between the current regulator sections 20A, 20B, 20C, 20D and 20E and the voltage regulator sections 16A, 16B, 16C, 16D and 16E is realized in the same way as in FIG. 3. However, in this case the ac sides of all current regulator sections 20A, 20B, 20C, 20D and 20E are connected in parallel with each other. They are also connected in parallel with a single tertiary winding 12T on the secondary side, which tertiary winding is magnetically coupled to the primary winding 12S as well as isolated from the primary and secondary windings 12P and 12S. It is also in this case possible with more voltage regulator sections than current regulator sections.

The different variations allow different amounts of active power to be supplied between the current regulator and voltage regulator portion. The different variations also have different design complexities, where generally the fewer the number the windings are, the simpler the design is, but the lower the possible exchanged power is. In this respect the third variation in FIG. 3 has a complex design and a fairly high power exchange capability. As was stated above, the use of one or more tertiary windings has the further advantage of isolating the current regulator input from the transformer output.

While again referring to FIGS. 1 and 2, the output handling block 14 may be realized as a chain link of switching blocks, where each switching block comprises at least one switch. The chain link is connected in series with the secondary winding 12B. The secondary winding may have two ends, where a first end is connected to the first end of the load L via the chain link and the second end may be connected to a second end of the load L. In this case the second end of the secondary winding 12S may also be connected to ground. Thereby the second end of the secondary winding 12S may also be a grounding end. Furthermore, the chain link is also connected between the first end of the secondary winding 12S and the first end of the load L. The chain link may in this case also have a first and a second end, where the first end is connected to the first end of the secondary winding 12S and the second end is connected to the first end of the load L.

The switching blocks of the chain link may be of a first and a second type, where the first type of switching block may be a type that provides voltage contributions from an energy storage element, such as from a capacitor. Therefore, this first type of switching block is a voltage contribution block. The second type of switching block may be of a type that interrupts or limits the current running through the chain link. Current interruption or limitation is traditionally carried out using a circuit breaker. For this reason, the second type of switching block may be termed a circuit breaker block.

Figure 5:
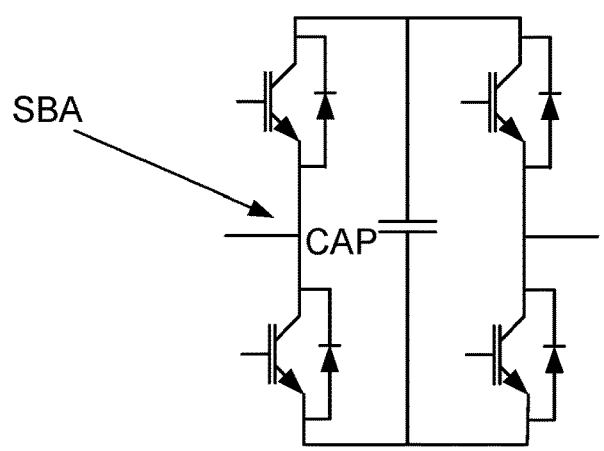
FIG. 5 schematically shows a first type of switching block used in the voltage regulator portion and optionally also in the current regulator.

FIG. 5 shows one realization of the voltage contribution block SBA. As illustrated, it comprises a first and a second string of electronic switches, where each string comprises two electronic switches and a midpoint of the string provides a connection terminal of the switching block. A midpoint of the first string provides a first connection terminal and a midpoint of the second string provides a second connection terminal of the block. An energy storage element in the form of a capacitor CAP is connected in parallel with the first and second strings. This type of block, which is a full-bridge block, can be controlled to provide a voltage contribution of zero or the voltage of the first energy storage element with one of two different polarities. The voltage contribution block thereby also has a bipolar voltage contribution capability.

Figure 6:
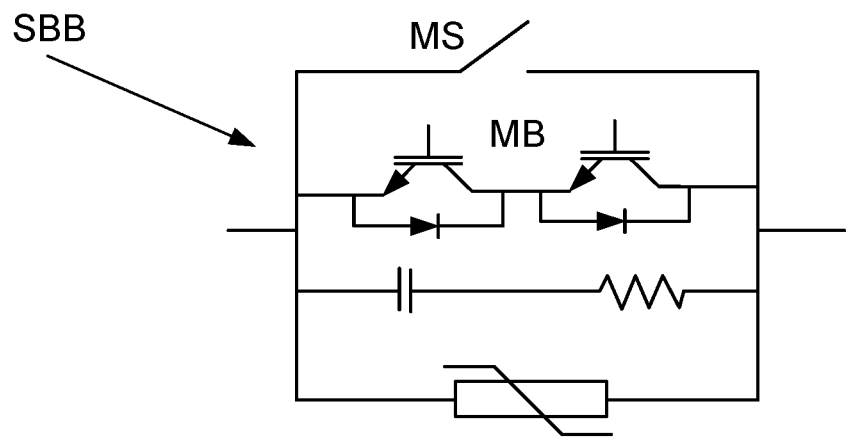
FIG. 6 schematically shows a second type of switching block used in the circuit breaker portion.

FIG. 6 shows one realization of the circuit breaker block SBB. The circuit breaker block SBB has a first end providing a first connection terminal and a second end providing a second connection terminal. It also comprises a mechanical switch MS connected between the connection terminals. A main breaker MB is connected in parallel with the mechanical switch MS, which main breaker MB is made up of one or more electronic switches. There is also a snubber string comprising a capacitor in series with a resistor, which snubber string is connected in parallel with the main breaker and mechanical switch. Finally, there is a surge arrester connected in parallel with the snubber string, the main breaker MB and the mechanical switch MS. The mechanical switch MS is typically closed during steady state operation. When current interruption or limitation is needed, the mechanical switch MS is typically first opened in order to commutate the current over to the main breaker MB. This is followed by opening of the main breaker MB leading to the current being commutated over to the surge arrester, where it is quenched.

The switches in the blocks may be made up of transistors with or without anti-parallel diodes. For this reason, the transistors may as an example be Insulated-Gate Bipolar Transistors (IGBTs), Bi-mode Insulated Gate Transistors (BIGTs), Metal Oxide Semiconductor Field Effect Transistors (MOSFETs) and Junction Field Effect Transistors (JFETs). The semiconductors used in the switches may also be either Silicon or wide bandgap semiconductors such as SiliconCarbide or GalliumNitride semiconductors, among others.

Both types of blocks may be connected in cascade in the chain link, with the first connection terminal of a first switching block in the chain link being connected to the second end of the transformer secondary winding and the second connection terminal of the first block being connected to the first connection terminal of a second block.

There may be a first set of voltage contribution blocks in the chain link that together make up the voltage regulator portion, where these voltage contribution blocks may be controlled by the control unit to form a voltage waveshape, such as a sinus waveshape. This may be done through controlling the switches of the voltage contribution blocks to bypass or insert the capacitor voltages with a positive or negative polarity. Thereby it is possible to create a waveshape providing an offset voltage ΔV with which the voltage across the secondary winding of the transformer is adjusted. The voltage regulator portion formed through the first set of voltage contribution blocks is thus configured to add the offset voltage to the voltage output by the transformer. Thereby the voltage regulation portion 16 may also be considered to form a voltage source. This can be seen in FIG. 7. The offset voltage ΔV may be set to be a fraction $k_1$ of the voltage $V_{TS}$ output by the transformer 12, i.e., a fraction of the voltage $V_{TS}$ at the secondary winding 12 of the transformer 12. The fraction may have an upper limit. The fraction may be at most 30% of the voltage output by the transformer. However, the fraction may also be lower such as at most 20%, 15% or even 10%.

The steady state fault free operation of the transformer arrangement will now be described.

Figure 7:
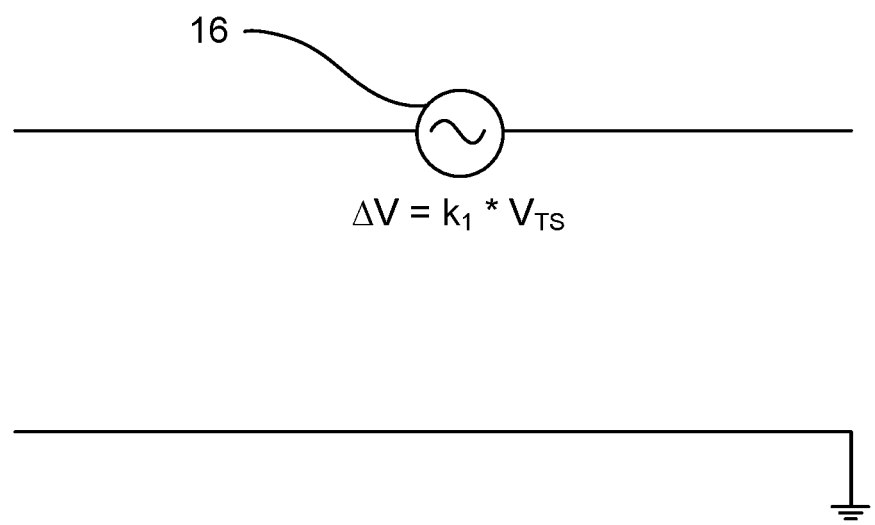
FIG. 7 schematically shows the voltage regulator portion as a voltage source.

As can be seen in FIG. 7, the voltage regulator portion 16 provides an offset voltage ΔV that is added to the transformer output voltage. This voltage may have any phase compared with the load current $I_{load}$, i.e. the current being supplied to the load connected to the transformer arrangement. If the phase angle of the offset voltage ΔV is ±π/2 then this voltage source can be seen as adding an impedance to the transformer output voltage, which impedance may be an inductance or a capacitance. The voltage regulator portion can also introduce phase shifts in the output voltage. The voltage regulator portion may also draw or add reactive power from or to the ac link. However, for other phase angles typically active power may also be injected to or withdrawn from the ac link. When active power is injected into the ac link, then this active power is taken from the current regulator, while if active power is drawn from the ac link, the drawn active power is supplied to the current regulator.

When injecting active power to the ac link ACL, the current regulator may be controlled to draw active power from the winding to which it is connected and supply this power to the voltage regulator portion via the dc link, which in turn is controlled to inject it into the ac link ACL. When drawing active power from the ac link ACL, the voltage regulator portion may be controlled to draw active power from the ac link ACL and supply it to the current regulator via the dc link, which current regulator in turn is controlled to inject the active power into the winding to which it is connected.

Through the above-mentioned operation, which may be implemented under the control of the control unit 22, it is thus possible to inject and withdraw active and reactive power to or from the ac link. It is additionally possible to provide a voltage change without the use of a tap changer or with a simpler tap changer realization.

Through also including a circuit breaker functionality it is possible to operate the chain link as a circuit breaker, for instance when disconnecting the transformer arrangement due to faults or because maintenance is needed. The second set of circuit breaker blocks forming the circuit breaker portion may thereby be configured to interrupt or limit a current running through the chain link. The control unit may for this reason be configured to control the second set of circuit breaker blocks to interrupt or limit the current through the chain link based on the detection of a fault, such as a fault in the phase to which the chain link is connected.

As was mentioned earlier, the chain link comprises both voltage contribution blocks and circuit breaker blocks. It should be realized that there may be as many voltage contribution blocks as are needed for a maximum sized offset voltage. The number of voltage contribution blocks used may thus be set for a desired voltage range of a voltage contribution to be added to the transformer voltage across the secondary transformer winding. The number of circuit breaker blocks may in turn be a number of blocks required for breaking or limiting a maximum sized load current. The number may thereby be a number required for achieving a desired current interruption or limitation level.

Although the voltage regulator portion and circuit breaker portion are shown as separate entities, it should be realized that they may be intertwined. The different blocks may be mixed and may thus be placed in any order in the chain link. A voltage contribution block may thus be placed between two circuit breaker blocks and a circuit breaker block may be placed between two voltage contribution blocks.

Figure 8:
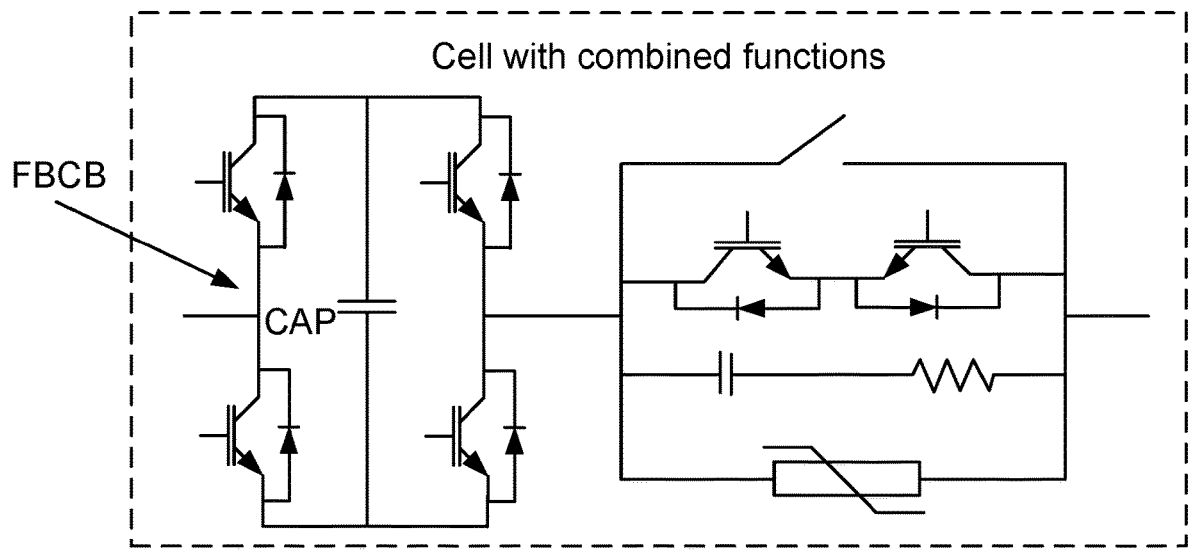
FIG. 8 schematically shows a cell formed through combining switching blocks of the first and the second type.

For this reason, and as can be seen in FIG. 8, a voltage contribution block may be combined with a circuit breaking block into a full bridge circuit breaker (FBCB) cell. A FBCB cell may comprise at least one voltage contribution block and at least one circuit breaker block. Depending on how many voltage contribution blocks and circuit breaker blocks that are needed, it is possible to have more than one block of one type than the other.

Figure 9:
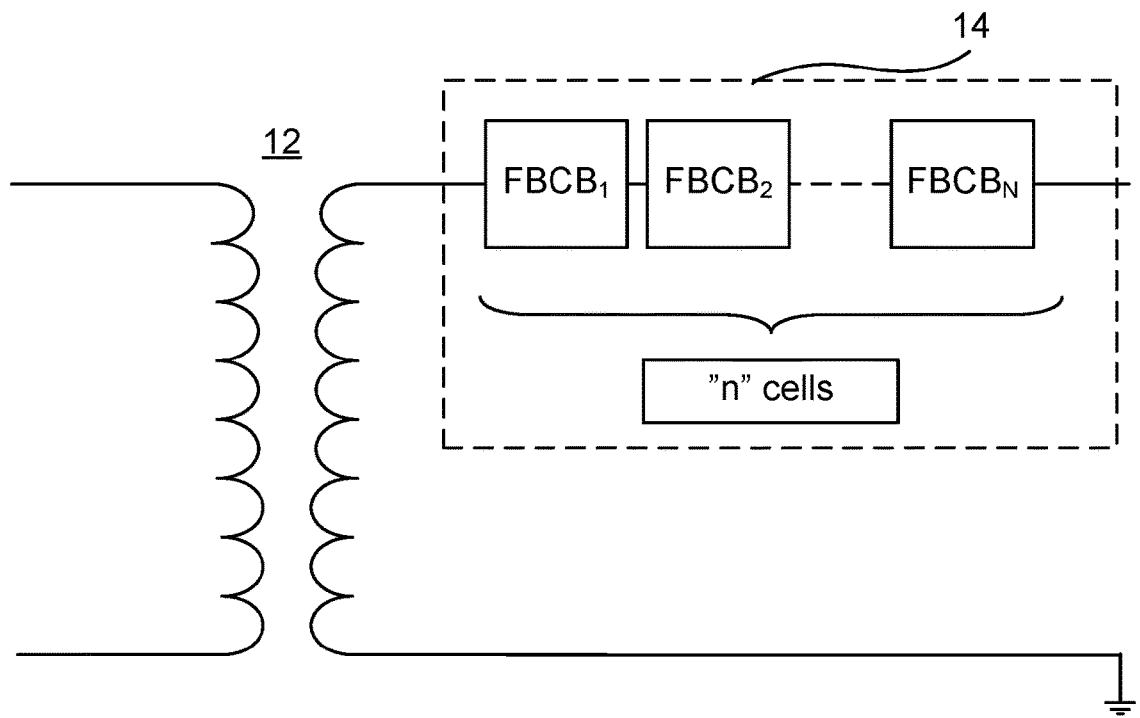
FIG. 9 shows the transformer arrangement equipped with cells in the output handling module.

As can be seen in FIG. 9 the output handling module 14 may thereby be made up of a number n FBCB cells. It is also possible to combine FBCB cells with either voltage contribution blocks and/or circuit breaker blocks in the chain link depending on the voltage contribution and current interruption or limitation demands.

There exist a number of possible further variations.

It is possible to provide harmonic and/or flicker voltage regulation using the first set of voltage contribution blocks. This has the advantage of relaxing filtering requirements of any additional filters.

The transformer arrangement thereby allows a multitude of functions to be combined, such as impedance regulation, power flow control, phase shifting, harmonic filtering and flicker regulation. This can also be done without the use of or with a simpler tap changer realization. Thereby the transformer design requirements may be relaxed.

The output handling module and the current regulator may be placed in the enclosure used for the transformer, which enclosure may be a transformer tank. The output handling module, the current regulator and the transformer may thus be provided together in the transformer tank. As an alternative either the output handling module, the current regulator or both may be provided in one or two separate enclosures.

It is additionally possible that the current regular and output handling module is combined in one device, for instance as a single PE power converter stage.

In the example given above the transformer arrangement was a single-phase transformer arrangement. It should be understood that it can also be realized as a three-phase transformer arrangement.

From the foregoing discussion it is evident that the present invention can be varied in a multitude of ways. It shall consequently be realized that the present invention is only to be limited by the following claims.

The invention claimed is:

1. A transformer arrangement comprising a transformer having a primary and a secondary winding, a current regulator and an output handling module comprising a voltage regulator portion and a circuit breaker portion, said output handling module being connected to the secondary winding and connectable in series between said winding and a load via an alternating current link (ACL) and said current regulator being connected in parallel with at least one winding magnetically coupled to the primary winding and said current regulator being connected to the voltage regulator portion of the output handling module via at least one direct current link such that active and/or reactive power can be injected in the alternating current link using the current regulator and voltage regulator portion, wherein the at least one winding with which the current regulator is connected in parallel is at least one tertiary winding, and wherein the current regulator comprises a number of current regulator sections, each connected to a corresponding voltage regular section of the voltage regulator portion via a corresponding dc link, and wherein each current regulator section is connected in parallel with a corresponding tertiary winding, or wherein all current regulator sections are connected in parallel with the same tertiary winding, and characterized in that the output handling module comprises a chain link of switching blocks connected to the secondary winding, said switching blocks comprising a first set of voltage contribution blocks forming the voltage regulator portion and a second set of circuit breaker blocks forming the circuit breaker portion, wherein the first set of voltage contribution blocks is configured to add an offset voltage to the voltage output by the transformer and the second set of circuit breaker blocks is configured to interrupt or limit a current running through the chain link.

2. The transformer arrangement according to claim 1, wherein the output handling module is connected to a first end of the secondary winding and connectable between the first end of the secondary winding and a first end of the load.

3. The transformer arrangement according to claim 1, wherein the voltage contribution block is a voltage contribution block with bipolar voltage contribution capability.

4. The transformer arrangement according to claim 3, wherein the number of voltage contribution blocks are selected for a desired voltage range of a voltage contribution to be made to the voltage across the corresponding transformer winding and the number of circuit breaker blocks are selected for achieving a desired current interrupting or limiting level.

5. The transformer arrangement according to claim 1, wherein the first set of voltage contribution blocks is controllable to regulate harmonics and/or flicker in the voltage output by the transformer.

6. The transformer arrangement according to claim 5 wherein the second set of circuit breaking blocks is controllable to interrupt or limit the current through the chain link based on the detection of a fault.

7. The transformer arrangement according to claim 1, wherein the second set of circuit breaking blocks is controllable to interrupt or limit the current through the chain link based on the detection of a fault.

8. The transformer arrangement according to claim 7 wherein at least some of the blocks are grouped into cells, each cell comprising at least one voltage contribution block and at least one circuit breaking block.

9. The transformer arrangement according to claim 1, wherein at least some of the blocks are grouped into cells, each cell comprising at least one voltage contribution block and at least one circuit breaking block.

10. The transformer arrangement according to claim 9, wherein the number of voltage contribution blocks are selected for a desired voltage range of a voltage contribution to be made to the voltage across the corresponding transformer winding and the number of circuit breaker blocks are selected for achieving a desired current interrupting or limiting level.

11. The transformer arrangement according to claim 1, wherein the number of voltage contribution blocks are selected for a desired voltage range of a voltage contribution to be made to the voltage across the corresponding transformer winding and the number of circuit breaker blocks are selected for achieving a desired current interrupting or limiting level.

12. The transformer arrangement according to claim 1, further comprising a control unit configured to control the current regulator, voltage regulator portion and circuit breaker portion.

* * * * *